UNITED STATES PATENT OFFICE.

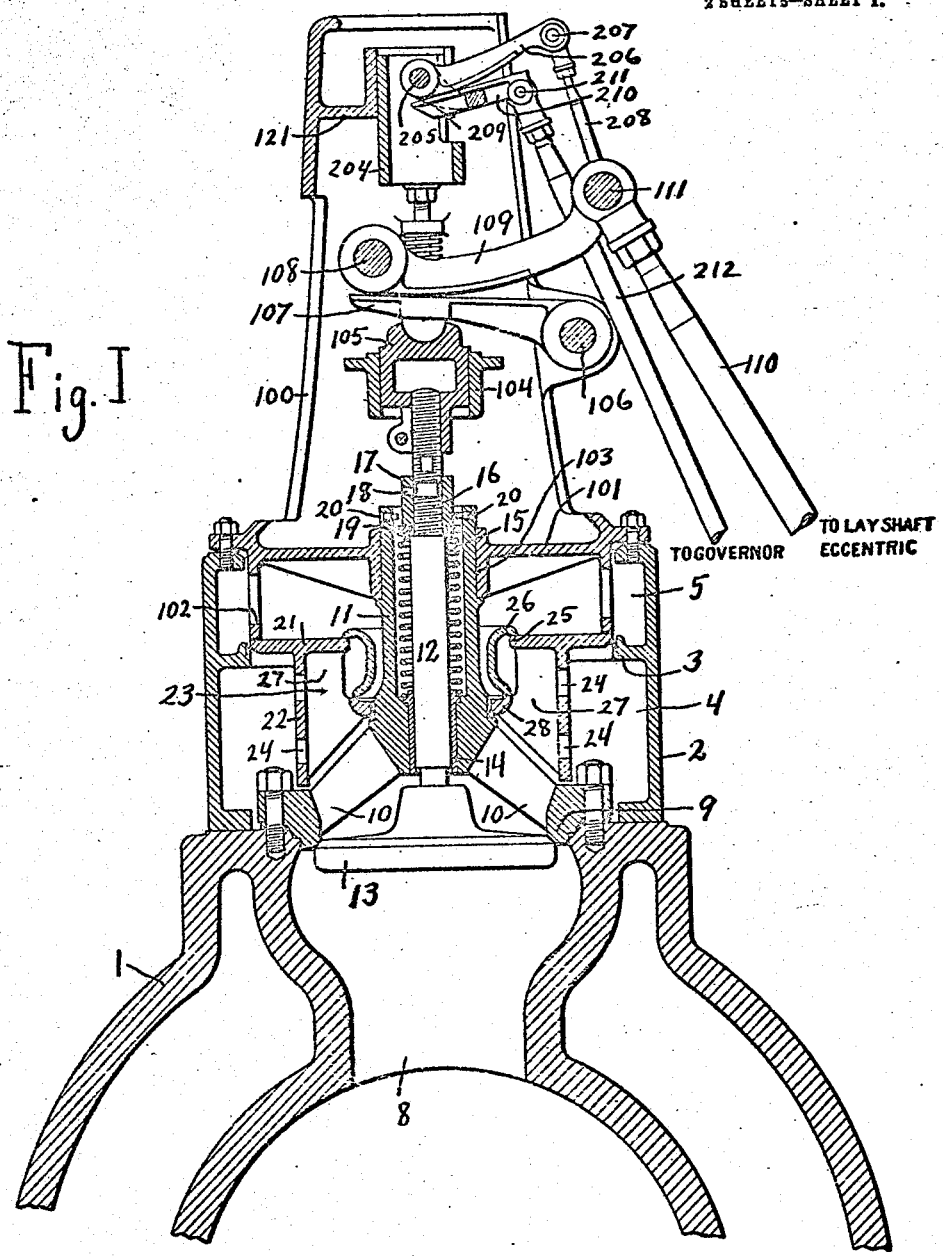

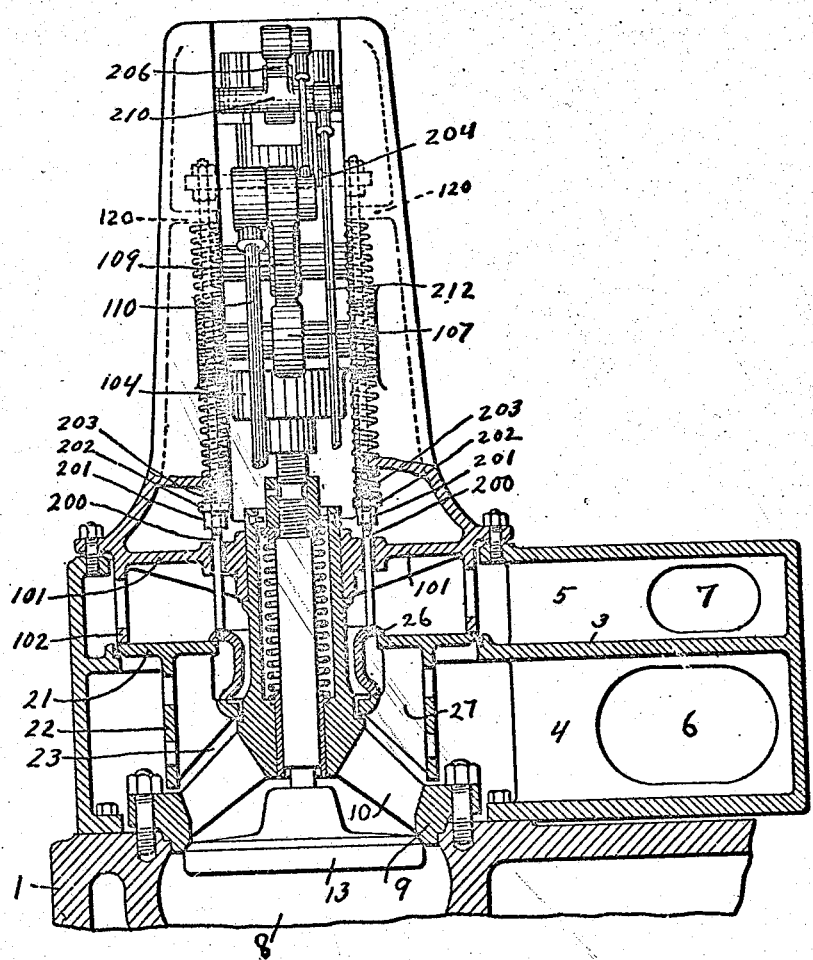
Fig. II.

CARL G. SPRADO, OF MILWAUKEE, WISCONSIN, ASSIGNOR TO ALLIS-CHALMERS COMPANY, OF MILWAUKEE, WISCONSIN, A CORPORATION OF NEW JERSEY.

VALVE AND VALVE-CASING.

No. 895,056.      Specification of Letters Patent.      Patented Aug. 4, 1908.

Application filed October 6, 1906. Serial No. 337,712.

*To all whom it may concern:*

Be it known that I, CARL G. SPRADO, a citizen of the United States, residing at Milwaukee, in the county of Milwaukee and State of Wisconsin, have invented certain new and useful Improvements in Valves and Valve-Casings, of which the following is a specification.

This invention relates to a structure of valve casing and valves especially adapted for use in connection with gas engines but the use of which is not necessarily limited to gas engines.

The invention relates to certain specific structural arrangements of the several parts of the valve casing and valves to be hereinafter specifically described in the specification and claimed.

In the construction heretofore of gas engines it has been customary, especially in engines of the larger sizes, to form the valve casings as a part of the cylinder structure, or in large sections to be attached to the cylinder structure, with the result that when the engine was assembled if it became necessary or desirable to disassemble the valve structure, it became necessary to disassemble practically the entire engine.

In using certain kinds of gases to form an explosive mixture for the operation of the gas engine, it is found desirable, and in some cases absolutely necessary, to overhaul the valve casings, valves and gas passages adjacent thereto in order to remove deposits of tar, etc. which have accumulated.

The purpose of this invention is to provide a simple and efficient valve structure and surrounding casing which can be readily disassembled by the removal of a few comparatively light parts affording access to the interior of the casing, and further providing that no adjustments of the valve mechanism need be disturbed so that when the parts are reassembled and the driving rods for the mechanism are pinned to their respective levers, the whole mechanism will be in exactly the same adjustment as it was before the parts were disassembled.

On the drawings which form a part of this specification and on which the same reference characters are used to indicate the same elements wherever they appear in the several figures of the drawings,—Figure 1 represents an elevation in transverse section of a portion of a gas engine cylinder with a valve casing and valve mechanism secured thereto. Fig. 2 is a longitudinal vertical section through a portion of the cylinder and the valve casing, the upper part of the hood or bonnet being shown in elevation.

Referring to Fig. 1 of the drawing, the reference character 1 represents the cylinder of a gas engine upon the top of which is secured by bolts or otherwise, a valve casing 2, which is elongated in the direction of the length of the cylinder, as clearly shown by Fig. 2, and is provided with an interior partition 3, which provides in the interior thereof an air passage 4, and a gas passage 5, the said passages being provided with inlets 6 and 7 respectively, which are adapted to be connected with the air supply pipe and gas supply pipe respectively. Ordinarily two of these valve casings will be used situated one at each end of the cylinder, this being the common practice with four cycle, double acting gas engines, though of course a single casing could be used at one end of the cylinder for a single acting engine.

The cylinder is provided with an inlet passage 8 and in line with this passage, the top, bottom and partition of the valve casing are similarly provided with apertures, these apertures, however, being slightly larger than the size of the inlet passage 8 where it emerges through the outer surface of the cylinder.

Seated concentric with the passage 8 is the valve seat 9 which is secured by bolts or otherwise against the exterior of the cylinder, and in the construction shown this valve seat projects into the inlet passage 8 and affords a seat for a valve on the lower surface thereof. Preferably formed integrally with this ring 9 are spider arms 10, which in turn are united with the guide or core 11, which guide extends upwardly beyond the upper surface of the valve casing 2. This guide is apertured to receive the valve stem 12 of the inlet valve 13, and is provided with a bushing 14. Surrounding the valve stem and located within the aperture of the guide, is a spiral spring 15, the purpose of which is to ordinarily retain the valve 13 against its seat on the ring 9. The valve stem 12 is provided with a threaded portion 16 upon which a threaded nut 17 is adapted to be moved by means of a spanner engaged with an aperture 18 or by any other suitable means. Between the nut 17 and the spring 15 is a collar 19 freely movable with respect to the valve stem 12.

Located in the upper part of the guide 11 are screws 20 which project through said guide and extend into the recess therein to a sufficient extent to be engaged by the collar 19, the purpose of these screws being to retain the spring 15 within the aperture of the guide 11 if it becomes desirable to remove the nut 17 in order to remove the valve stem 12 and valve 13 from said guide.

Seated upon the partition 3 is an annular plate 21 which contracts the opening through partition 3, said opening being large enough to admit of the ring 9 being removed therethrough. This plate is provided with a depending cylinder 22 which is apertured so that air may readily pass from the air passage 4 to the annular mixing space 23 provided in the interior of said cylinder 22. The apertures 24 provided in said cylinder are intended to allow the air to pass into the interior of said cylinder in separate streams so as to more readily mingle with the gas which is also allowed to pass into the interior of said cylinder. This plate 21 is properly luted or packed at the points where it contacts with the partition 3 and is provided with a central aperture 25 which is adapted to receive the gas valve 26.

The plate 21 and cylinder 22 depending therefrom are also provided with projecting fins or blades 27, which carry a ring 28 surrounding the guide 11 and properly packed with respect to said guide so as to be gas tight, said ring affording a seat for the lower end of the valve as clearly shown by the drawings.

Secured upon the open face of the valve casing 2 by bolts or otherwise, is the bonnet 100. This bonnet is provided with the plate 101 which forms a closure for the opening in the top of the valve casing, and projecting from the lower side of said plate is the grated cylinder 102 which is adapted to rest upon the plate 21 and retain said plate 21 seated on the partition 3. The plate 101 is also provided with an aperture 103, through which the guide 11 projects, the two being provided with a gas tight luting between them.

The reference character 104 represents a guide which is preferably formed integral with the bonnet 100 and is apertured to receive the head 105 secured by screw threaded engagement with the upper end of the valve stem 12.

Pivoted to the bonnet at 106 is the lever 107 which is adapted to bear upon the top of the head 105, and also secured by a pivot to the bonnet at 108 is the rocker 109 which is adapted to be rocked by the engine through the medium of the connecting rod 110 pivoted to said lever by the pin 111 and strapped about the lay shaft eccentric; the motion transmitting parts not being shown.

The gas valve 26 is secured to rods 200 which project through apertures provided in the plate 101, and, as ordinarily the gas pressure is not great, it is found sufficient to pack them with a little oil, though if the gas used should be under any considerable pressure, suitable stuffing boxes should be provided in the apertures in said plate. These rods are composed of separate sections united by sleeve members 201, and upon each rod is secured a collar 202, between which collar and lugs 120 upon the bonnet are retained spiral springs 203, which springs normally keep the gas valve closed upon its seat. The upper ends of these rods are secured to a yoke member 204 which slidably engages a guide 121 formed preferably as a part of the bonnet. Pivoted to this yoke member by pin 205 is a rocker 206, which is pivoted by pin 207 to a connecting rod 208 which is connected at its other end to the pin 111. This rocker 206 is adapted to rock upon an arm 209 of a three-armed lever 210 which is pivoted to the bonnet on opposite sides of the yoke 204 see dotted lines, Fig. 1, the outer end of the lever being pivoted by pin 211 to the connecting rod 212, which in turn is connected with the governor, not shown. This valve mechanism operates as follows: Connecting rod 110 receives motion from some moving part of the engine and rocks the rocker 109 up and down on the lever 107 thereby opening the admission valve 13 and permitting said valve to be closed by the spring 15. At the same time the rocker 206 is rocked upon the lever 209 because of the connecting rod 208, whereby the gas valve 26 is opened and is permitted to be closed by the springs 203.

If now it becomes necessary or desirable to dismantle the valve mechanism to inspect or clean the parts, it is only necessary to withdraw pins 111 and 211 and swing the connecting rods 110 and 212 to one side. The bolts or other securing means which secure the bonnet to the top of the valve casing 2 are then removed and the bonnet with the plate 101 and cylindrical projection 102 are lifted off bodily, the aperture in plate 101 being sufficiently large to pass over the head 105 on top of the valve stem 12. The gas valve 26 will also be removed with the bonnet, unless the rods 200 have been separated into their sections by manipulating the sleeves 201. The plate 21 may now be removed bodily with its downwardly projecting cylinder 22, fins 27 and ring 28. The dismantling would ordinarily be completed at this point, as the inlet passage 8 could be inspected by pushing the valve 13 downwardly, which would also give an opportunity to inspect and clean the valve seat and valve.

Should it become necessary or desirable, however, to remove the ring 9 and valve 13, the head 105 and nut 17 will be removed from the upper end of the valve stem and the valve may be allowed to drop through the guide 11, and with the inlet passage 8 proportioned as shown, the valve would be retained in said passage. The bolts securing the ring 9 being removed, said ring and the guide attached thereto with spring 15 and collar 19 can be readily removed through the apertures in the partition 3 and the top of the casing 2. The valve 13 can then be picked out and the valve structure has been completely disassembled. Ordinarily the valve 13, head 105, nut 17, ring 9 and guide 11 will all be removed together as a unit instead of separating the parts as just stated.

In reassembling, the parts will be replaced in the inverse order to that in which they were disassembled, and then by simply replacing pins 111 and 211 the reassembling will be completed; the whole operation of disassembling and reassembling having been accomplished without necessitating disturbing a single adjustment. This feature is of special importance as the work can be intrusted to an ordinary laborer without necessitating the presence of an expert engineer to readjust the engine and get it in working order.

What I claim is,—

1. The combination with a cylinder provided with a port of a member provided with an aperture which is smaller than said port, said member being secured to said cylinder with its aperture in alinement with said port, a valve seating upon said member, a valve casing secured to said cylinder and provided with a partition in the interior thereof to provide separate air and gas passages in said casing, the casing and its partition being provided with apertures, said apertures being larger than said member to permit said member to be withdrawn therethrough, a valve controlling the thoroughfare through the aperture of said partition, a bonnet secured to said casing and closing one of the apertures therein, both of said valves being provided with stems extending into said bonnet, and means for operating said valves.

2. The combination with a cylinder provided with a port of a member provided with an aperture which is smaller than said port, said member being secured to said cylinder with its aperture in alinement with said port, a valve seating upon said member, a valve casing secured to said cylinder and provided with a partition in the interior thereof to provide separate air and gas passages in said casing; the casing and its partition being provided with apertures, said apertures being larger than said member to permit said member to be withdrawn therethrough, a plate provided with a thoroughfare contracting the aperture through said partition, a valve controlling the thoroughfare through said plate, a bonnet secured to said casing and closing an aperture therein, both of said valves being provided with stems extending into said bonnet.

3. The combination with a cylinder provided with a port of a member provided with an aperture which is smaller than said port, said member being secured to said cylinder with its aperture in alinement with said port, a valve seating upon said member, a valve casing secured to said cylinder and provided with a partition in the interior thereof to provide separate air and gas passages in said casing, the casing and its partition being provided with apertures, said apertures being larger than said member to permit said member to be withdrawn therethrough, a plate provided with a thoroughfare restricting the aperture through said partition, an apertured cylinder between the plate and the member, a valve controlling the thoroughfare through said plate, a bonnet secured to said casing and closing an aperture therein, both of said valves being provided with stems extending into said bonnet, and operating mechanism for the valves.

4. In combination with a gas engine cylinder a valve cylinder provided with apertures through which air may pass to the interior of said valve cylinder, one end of said valve cylinder being open to the gas engine cylinder, a core extending into the valve cylinder forming an annular mixing chamber within the valve cylinder and an annular port at the other end of the valve cylinder through which gas may pass to the annular mixing chamber, and a valve controlling the port.

5. The combination with an engine cylinder of a valve casing provided with apertures, means for partially closing said apertures, valves located within said casing and provided with stems which project through said casing to the outside thereof, said valves and the means for partially closing the apertures in said casing being so constructed and arranged with respect to said casing that they are removable from the cylinder independently from the casing.

In testimony whereof, I affix my signature in the presence of two witnesses.

CARL G. SPRADO.

Witnesses:
G. F. DeWEIN,
FRANK E. DENNETT.